(12) United States Patent
Ijdens et al.

(10) Patent No.: US 6,934,700 B1
(45) Date of Patent: Aug. 23, 2005

(54) FILE SYSTEMS SUPPORTED DATA SHARING

(75) Inventors: Pieter B. Ijdens, Eindhoven (NL); Ronald M. Tol, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/421,359

(22) Filed: Oct. 18, 1999

(30) Foreign Application Priority Data

Oct. 20, 1998 (GB) .............................................. 9822841

(51) Int. Cl.⁷ .............................................. G06F 17/30
(52) U.S. Cl. .......................... 707/2; 707/200; 707/205; 711/209
(58) Field of Search .................... 707/1–10, 100–104.1, 707/200–206; 711/147, 209, 2–6, 111; 369/53.31

(56) References Cited

U.S. PATENT DOCUMENTS

| | | | | |
|---|---|---|---|---|
| 5,371,885 A | * | 12/1994 | Letwin | 707/205 |
| 5,787,445 A | * | 7/1998 | Daberko | 707/205 |
| 5,832,515 A | * | 11/1998 | Ledain et al. | 707/202 |
| 5,832,526 A | * | 11/1998 | Schuyler | 707/205 |
| 6,215,748 B1 | * | 4/2001 | Greenwood et al. | 369/53.31 |
| 6,526,475 B1 | * | 2/2003 | Everett et al. | 711/111 |

FOREIGN PATENT DOCUMENTS

GB 2312059 A 10/1997 .......... G11B/20/12

OTHER PUBLICATIONS

"Multimedia File System Survey: Approaches For Continuous Media Disk Scheduling" By Ralf Steinmetz, Computer Communications, vol. 18, No. 3, Mar. 1995 pp. 133–144.

* cited by examiner

*Primary Examiner*—Shahid Alam
*Assistant Examiner*—Jean Bolte Fleurantin
(74) *Attorney, Agent, or Firm*—Michael E. Belk

(57) ABSTRACT

A storage file system is provided for data stored on a storage medium, and particularly for storage of data on optical disc storage medium. Each successive or alternate file of data included in the storage medium is represented by a respective allocation extent list with each allocation extent identifying locations of data segments for each file. Data in some data segments or portions of data segments may be shared by two or more files with each file having a respective allocation extent list entry referencing that segment and each such allocation extent maintaining byte-accurate pointers to the start and end of the data relevant to each file within the data segment. An allocation space table containing respective entries for each reference to a data segment or portion of a data segment, and optionally a free-space table identifying those data segments or portions of data segments available for rewriting, may be provided to allow for rapid reclamation of free within the storage medium.

27 Claims, 5 Drawing Sheets

FILE SYSTEMS SUPPORTED DATA SHARING

FIELD OF THE INVENTION

The present invention relates to methods and apparatus for data storage and retrieval, and to storage devices for such data—particularly, but not essentially, optical disc storage devices.

BACKGROUND OF THE INVENTION

Recent years have seen a great expansion in the complexity of consumer electronics equipment with several different proprietary and technical standards governing interconnectivity and data storage. In connection with the latter feature, the domestic user has in the past used different mechanical and functional configurations of storage device, such as a VHS cassette for video recording, an audio compact cassette for audio recordings from Hi-Fi equipment, and hard and floppy discs for data storage on personal computers. With the advent of recordable optical discs conforming to unified standards as far as data layout, bit rates etc. are concerned, such discs may (if configured to the particular recording system) replace many of the disparate options, and hence the possibility of a single unified standard, both in terms of physical configuration and data management, may be contemplated for all types of domestic audio/video/data-processing systems.

In conjunction with this increased commonality in the field of storage media, there is an increasing degree of requirement for sharing in the expected and actual functionalities of the devices themselves. Of particular relevance to the present invention is the digital recording of audio and/or video (AV) material, with the user coming to expect the same sort of facilities for arranging and editing of stored data that they experience from, for example, a personal computer. In terms of available devices, optical media were not particularly suited for video storage applications due to their hitherto limited storage capacity, although this is becoming less of an issue: for example, a disc according to DVD-ROM standards may store in the region of 8 hours of video compressed following MPEG2 protocols. Further developments are providing optical drives with a capacity of tens of gigabytes per storage device (disc) and real-time video recording applications based around such storage devices are contemplated.

Whilst many efficient schemes have been proposed for recording and storage of program data, it will be understood, however, that there are constraints to be observed in the storage of AV material which differ from those applied in the generation of efficient file structures and file handling in a purely data-oriented environment. Of particular relevance is the system-imposed desire for sections of video data (which may be interleaved with data for an accompanying soundtrack) to be stored contiguously such as to enable the encoded video data to be read fast enough to avoid presenting visible discontinuities to the viewer—for example to meet the applicable buffering constraints where the video data is MPEG encoded.

Inefficient storage file structures can lead to problems in these areas and a number of strategies have been proposed for enhanced efficiency in is multimedia data storage and retrieval, particularly for magnetic disc storage, as described in "Multimedia file systems survey: approaches for continuous media disk scheduling" by Ralf Steinmetz, Computer Communications Vol. 18, No. 3, March 1995 pp. 133–144.

As is mentioned by Steinmetz, it is possible for data to be shared between files, a particular example of which would be different versions of a stored file (e.g. a censored children's version and an adult uncut version of a film) on a single disc with simple re-use of common sections of data where appropriate to avoid the need for storing full-length but only slightly different versions of a file. At present however, insofar as the idea of re-usability of data has been concerned, it has been based on media where the data is subdivided into convenient uniform segments (for example sectors on a recordable disc) with sharing of file sections only being supported at the segment level. The result of this has been that either edited versions of a file are forced to include whole segments when only a small part thereof may have been desired, or the segment size has to be very small to permit flexibility in editing operations, which is both wasteful of disc space and creates an unacceptably high processing overhead.

SUMMARY OF THE INVENTION

It is therefore an object of the present invention to provide a storage means (and support means for the implementation of the same) with an internal data structure that supports multiple edits through re-use of whole or partial recording fragments/segments.

It is a further object to provide such storage means utilizing features of the internal data structure for the efficient reclamation of storage area containing redundant data in whole or partial fragments.

In accordance with the present invention there is provided a storage device comprising a first area subdivided into segments for the recording of sequential data, portions of which when read in a predetermined sequence comprise a data file, the device further comprising a second area containing a list of allocation extents, each of which identifies the start and end of a contiguous part of the first area, and a pointer file containing a list of pointers to respective entries in the list of allocation extents; characterised in that the device carries at least two files defined in respective pointer files and at least a part of a segment is common to the two files, with each file having a respective allocation extent for that segment and each allocation extent indicating the start and end points within the segment for that part of the segment used in the respective files. By the provision of respective allocation extents for each usage of data from a segment, a simplification in the handling of multiple files containing shared data results. Furthermore, by having each allocation extent specify not just the particular segments but also the start and end points within those segments, the constraint for shared data having to be specified as a whole segment is removed, permitting greater flexibility in the possibilities for editing the stored data.

The second area (which may be in the form of a plurality of discrete areas distributed amongst the segments of the first area) may further comprise an allocation space table containing entry for each allocation extent, the table providing a record of all single or multiple uses of first area segments. With this table, the entries for which are created and/or updated with the allocation extents, it is not necessary for a device looking to delete or overwrite segments or partial segments to scan all the allocation extents to identify redundant segments, particularly where the space table is suitably arranged to provide a map of current first area usage. In this respect, the second area may further contain a free-space table the contents of which are derived from the contents of the allocation space table and identify all segments or parts of segments available for writing to. Although generation and maintenance of the free-space table requires extra processing capability in a hosting system, it does provide notable benefits in applications where large volumes are to be stored in various edited forms and free-space reclamation is a necessity.

Each of the allocation extents may suitably identify a start point in terms of a number of bytes or other data subdivisions (e.g. MPEG2 data packs) to be ignored from the start of a segment, and/or an end point in terms of a number of bytes (or packs) to be ignored at the end of a segment. By specifying the start and end points as distances from an also specified segment start and end, backwards compatibility with older systems which only specify to a segment level is possible whilst retaining or maintaining compliance with block or pack-based encoding protocols such as MPEG.

Whilst the storage medium may be a magnetic disc, in a preferred embodiment the storage device is an optical disc and the data written to segments of the first area comprises digitised audio and/or video material with the pointer files comprising respective playlists for all or selected parts of the material. This allows for example different versions of an AV presentation (such as different edits of a film) to be held on a single disc—perhaps coupled with system support for parental restriction on playback of some versions without requiring each version to be separately stored as a distinct and separate entity. Note that references herein to storage "in" and storage "on" a storage device or medium are used interchangeably, with neither being intended to refer to a specific form or configuration of storage device, unless explicitly stated.

As a disc (optical or magnetic), all segments of the first area may be of a common size, and each of the first and second areas may comprise respective tracks or contiguous groupings of plural tracks. Note, however, that the division into first and second areas is necessary only from a logical point of view, and the two areas may appear consecutively or adjacent in the chosen storage medium or may even be interleaved if handling for such an arrangement is within the capabilities of the read/write apparatus. Also, the respective pointer files for multiple files on a disc may be grouped together in a file table or may be distributed across the disc.

Also in accordance with the present invention there is provided a method for formatting memory space in a storage device or medium, a data processing device operable to manipulate data in a first area of a storage medium or device formatted according to such a method, and such a processing apparatus further operable to implement the formatting method, all as described in the attached claims to which the readers attention is now directed and the disclosure of which is herein incorporated by reference.

BRIEF DESCRIPTION OF THE DRAWINGS

Preferred embodiments will now be described by way of example only, and with reference to the accompanying drawings in which.

DETAILED DESCRIPTION OF THE INVENTION

Figure 1:
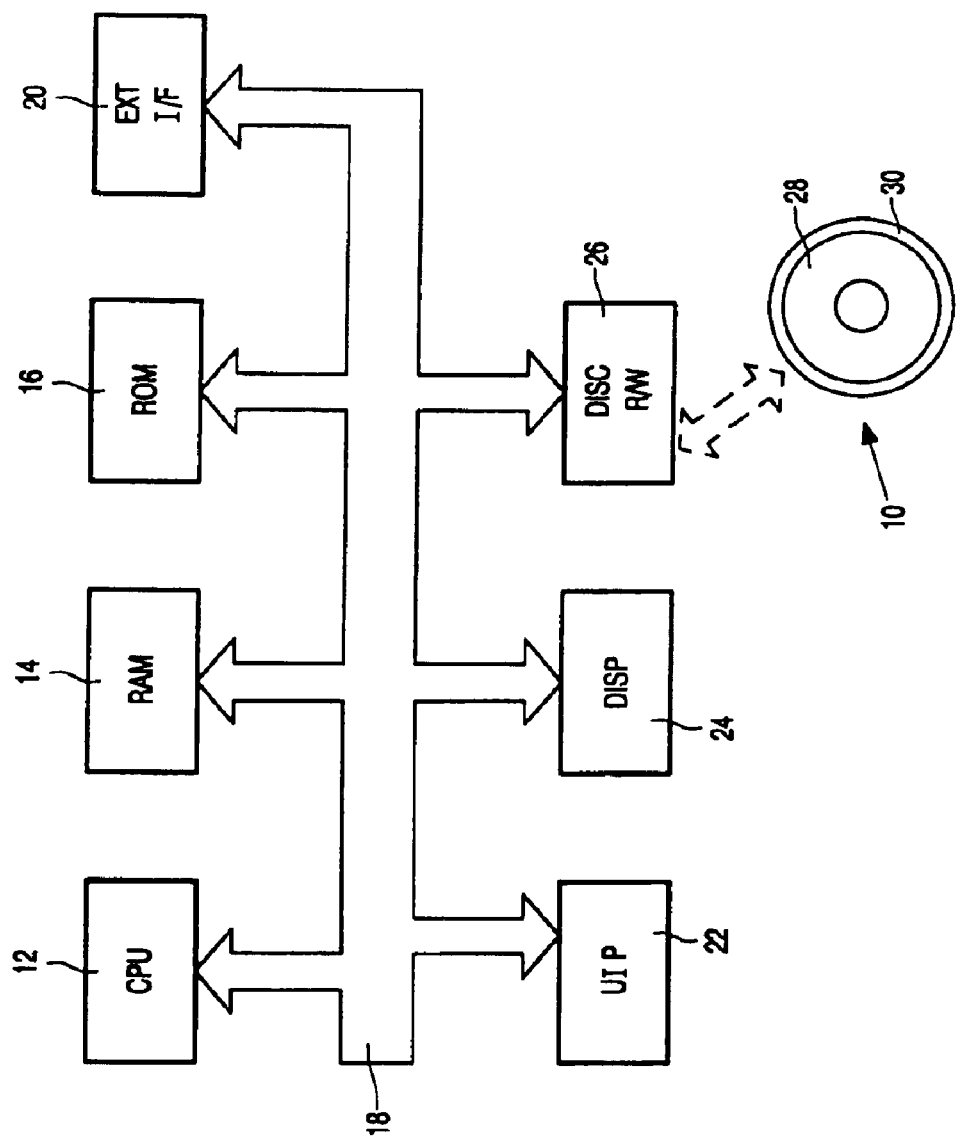
FIG. 1 is a block schematic diagram of a data processing apparatus which may be configured to effect the formatting of the present invention.

Beginning with FIG. 1, there are shown the basic components of a data processing apparatus such as may be used for the formatting and storing of data on an optical disc 10. The apparatus consists of a central processor (CPU) 12 coupled with random-access (RAM) 14 and read-only (ROM) 16 memory devices via an address and data bus 18. An external interface (EXT I/F) 20 represents the apparatus connection with external data sources. As will be recognised, the configuration of this interface will be dependent on the type of external data source and the overall function of the data processing apparatus: for example, where the apparatus is a domestic video/audio recorder, the interface will provide the connection and reception means for the source of video/audio signals to be recorded (e.g. from a satellite receiver) or, where the apparatus is a personal computer, it may comprise a link to remote data sources by way of, for example, an Internet interface.

Also coupled with the CPU 12, memories 14, 16, and interface 20 via the bus 18 are one or more user input means (UIP) 22 and a display 24; for a PC-based apparatus, these devices may comprise respectively a keyboard and monitor, whereas for a domestic recorder apparatus they may comprise user control buttons and an L.E.D display on the apparatus front panel. A further component is an interface to a storage medium, in this example an optical disc record/playback unit (DISC R/W) 26 providing both the physical means to receive and read from/write to optical disc 10 and an internal set of operational protocols for reading/writing from/to a disc formatted according to a predetermined standard. As will be well understood, the protocol handling of the unit 26 may be effected by an internal slave processor with associated memory (not shown) under control of CPU 12, or these functions may be handled directly by CPU 12 with reference to protocol commands held at bootstrap level in ROM 16 or periodically reloaded to RAM 14.

In FIG. 1, the optical disc 10 is shown with a nominal division into a first area 28 carrying a sequence of full, free, or partially written data segments, and a second area 30 carrying a number of control structures (file tables, allocation extent fists, free-space structures etc.) the function of which will be described in detail below. As previously stated, the division into discrete first and second areas is necessary only from a logical point of view, to distinguish between the pure data carrying and functional on-disc structures. In practical terms, although they may be distinct entities recorded on separate track areas of a disc (for example), for an operational embodiment savings in terms of reduced seek delays (and hence reduced access times) may be obtained through distributing the second area amongst the first, for example with file and allocation extent tables describing whole and partial disc segment usage being placed on disc adjacent those segments referred to.

Figure 2:
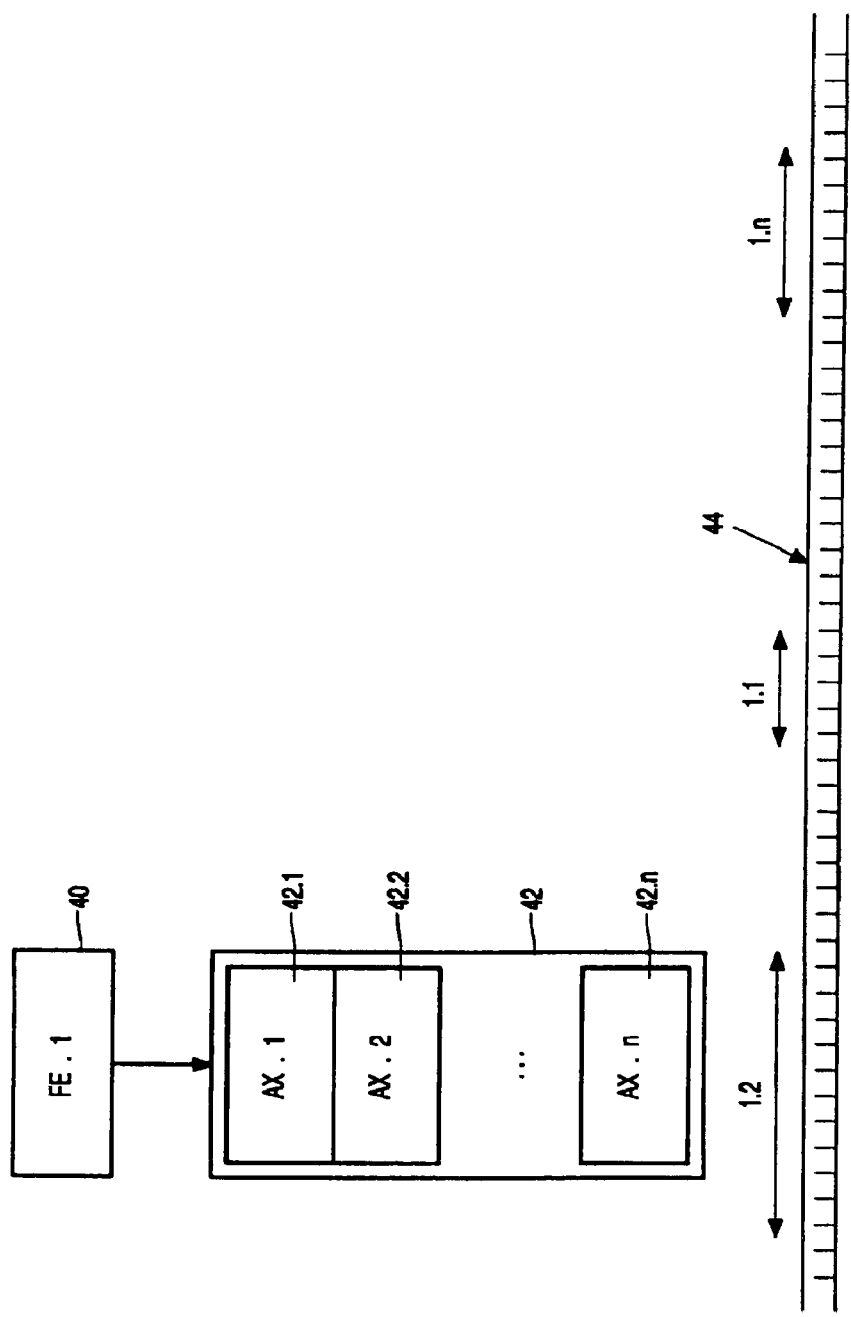
FIG. 2 represents the relationship between a data file in the form of a playable object specified at database level to stored data fragments in a sequential recording medium.

FIG. 2 illustrates the relationship between a data file entry (also referred to as a playable object) specified at database level and those individual fragments of data stored at various locations on disc which are to be replayed in the correct sequence to recreate the data file. Each file on the disc is represented by an entry (FE.1) 40 in a file table written to the second area. At database level, this file entry contains data about the file as a whole (its name, date of creation etc.) or where the file is in multiple sequential parts, the entry will uniquely identify the part and its place in the sequence. At the system level, this entry 40 references a list 42 containing one or more allocation extents AX 42.1, 42.2 . . . 42.n each of which identifies the start and end of a respective contiguous section (1.1, 1.2, . . . 1.n) of linear storage, as represented by the sequence of storage areas 44 in the lower part of the Figure.

In known manner, for ease of accessing, the linear storage 44 may be divided into a sequence of commonly-sized or commonly specified logical sectors or segments, the size of which may be set to a fixed number of bytes (such as 2048) or a predetermined other grouping of data such as encoded MPEG blocks. Note that the physical ordering of used segments need not be reflected in the physical order in which the data they carry is to be replayed. However, proximity of successive portions of a file is preferred as this minimises delays due to seek times and reduces the likelihood of problems with buffering constraints for time-critical data such as MPEG audio/video.

Each of the allocation extents AX 42.1, 42.2 . . . 42.n specifies the respective portion of data 1.1, 1.2 . . . 1.n both in terms of the start and end points for the segment or segments that contain it, to enable backwards compatibility with systems that only specify to whole-segment granularity, and in terms of the number of bytes (or other arbitrary block divisions) that are to be ignored at the start and/or end of each segment.

Figure 3:
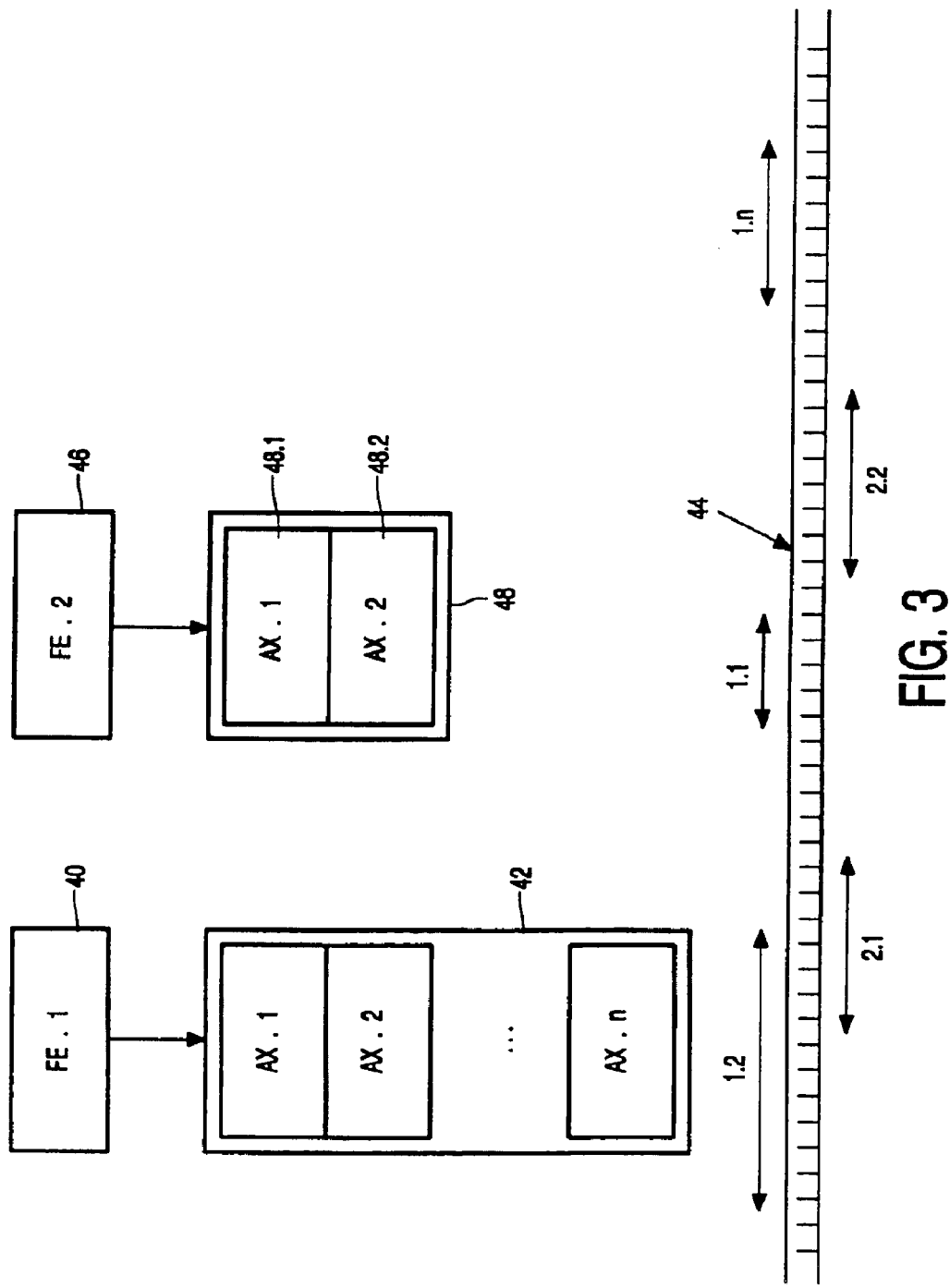
FIG. 3 is similar to FIG. 2 and shows a pair of playable objects sharing common data in respective fragments.

In FIG. 3, a second file entry (FE.2) 46 is shown added which file entry has a respective list 48 of allocation extents AX 48.1, 48.2 each identifying respective portions 2.1, 2.2 of the linear sequence of segments 44. This second file sequence may comprise a distinct entity from the first 40, or it may be a subsequent but sequential pad of a larger file specified by sequential entries in the file table. In either case, the point to note is the re-use of a part of the stored data in those segments where portions 1.2 and 2.1 overlap.

Figure 4:
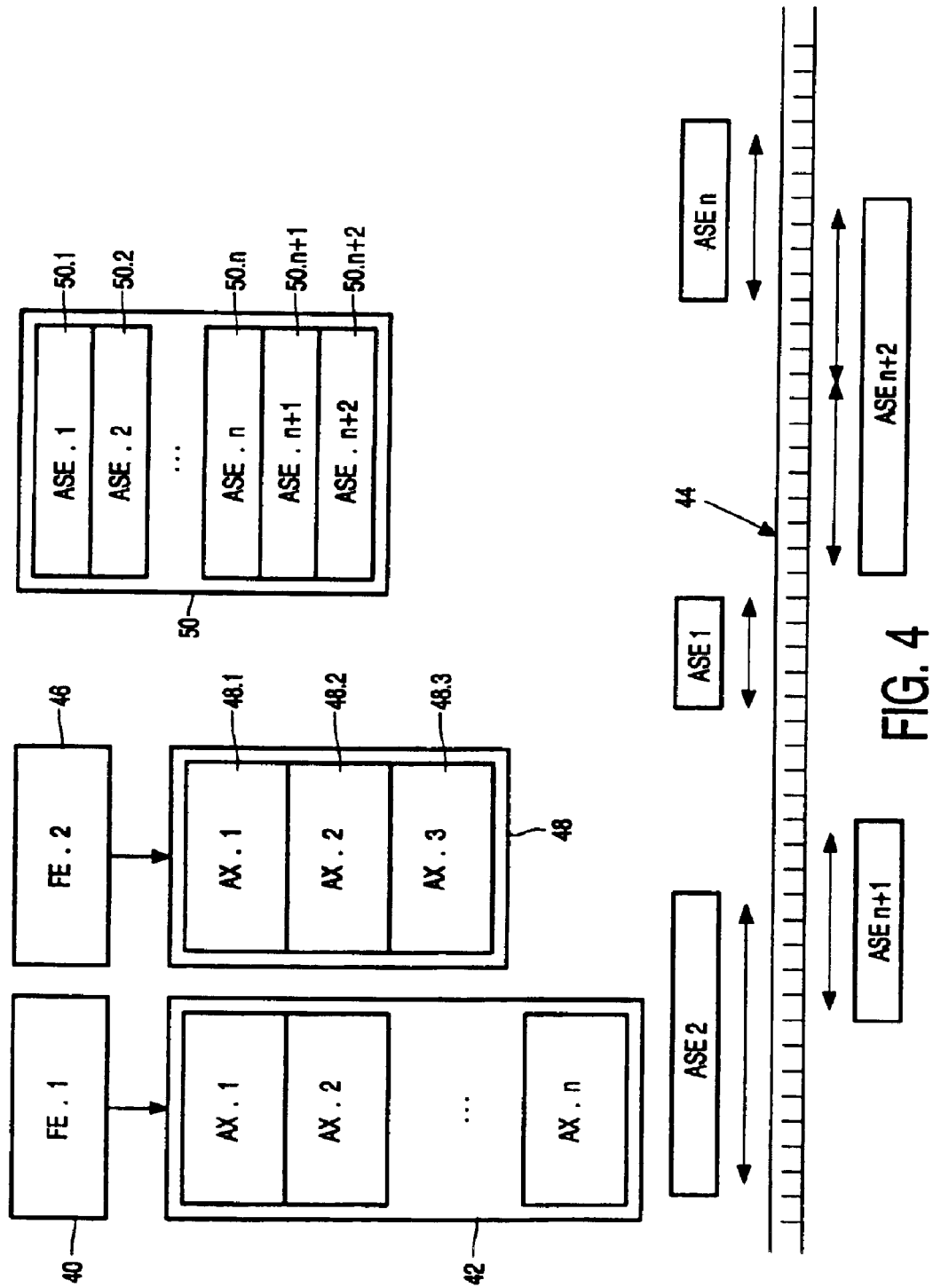
FIG. 4 represents an allocated space table for a pair of playable objects similar to those of FIG. 3.

FIG. 4 represents an additional structure, allocation space table 50, stored in the second area. A further allocation extent AX 48.3, physically and temporally contiguous with its predecessor 48.2 from the second file entry (FE.2) 46 is also added. In general, each allocation extent will have a respective entry in the allocation space table 50 (42.1= ASE1=50.1; 42.2=ASE2=50.2; 42.n =ASEn=50.n; 48.1= ASEn+1=50.n+1). The exception to this is where there are pairs of contiguous, non-overlapping portions, as specified by allocation extents 48.2 and 48.3 when, for reasons of both data saving and efficiency, a single allocation space entry (ASEn+2) 50.n+2 is written to table 50.

The allocation space table 50 provides, in a single location, an indication of the usage (full, partial or empty) for each segment (and hence each byte) of the first area, which table is updated each time new data, or a new edit of existing data, is created in the storage medium. For ease of creation, as shown the entries to the table may be written in file order—that is to say the usage for each allocation extent of the first file is listed before the usage for each allocation extent of the second file and so on. For enhanced ease of use, for example in systems seeking free segments or parts of segments for the interleaving of ancillary data to accompany a stored video sequence, the allocation space table may be arranged in sequential order of the specified start points regardless of which file the particular portion is used in, such that scanning to find localised free space does not require the checking of every entry in the list 50. Whilst this will require some additional processing when creating multiple edits of a block of data stored over many segments, handling the list 50 as a stack (and offloading to read/write apparatus RAM for updating) is not problematical. Furthermore, the benefits when seeking to reclaim redundant storage area, perhaps for ancillary data use or for further AV data as the disc/storage device becomes full, are notable.

Figure 5:
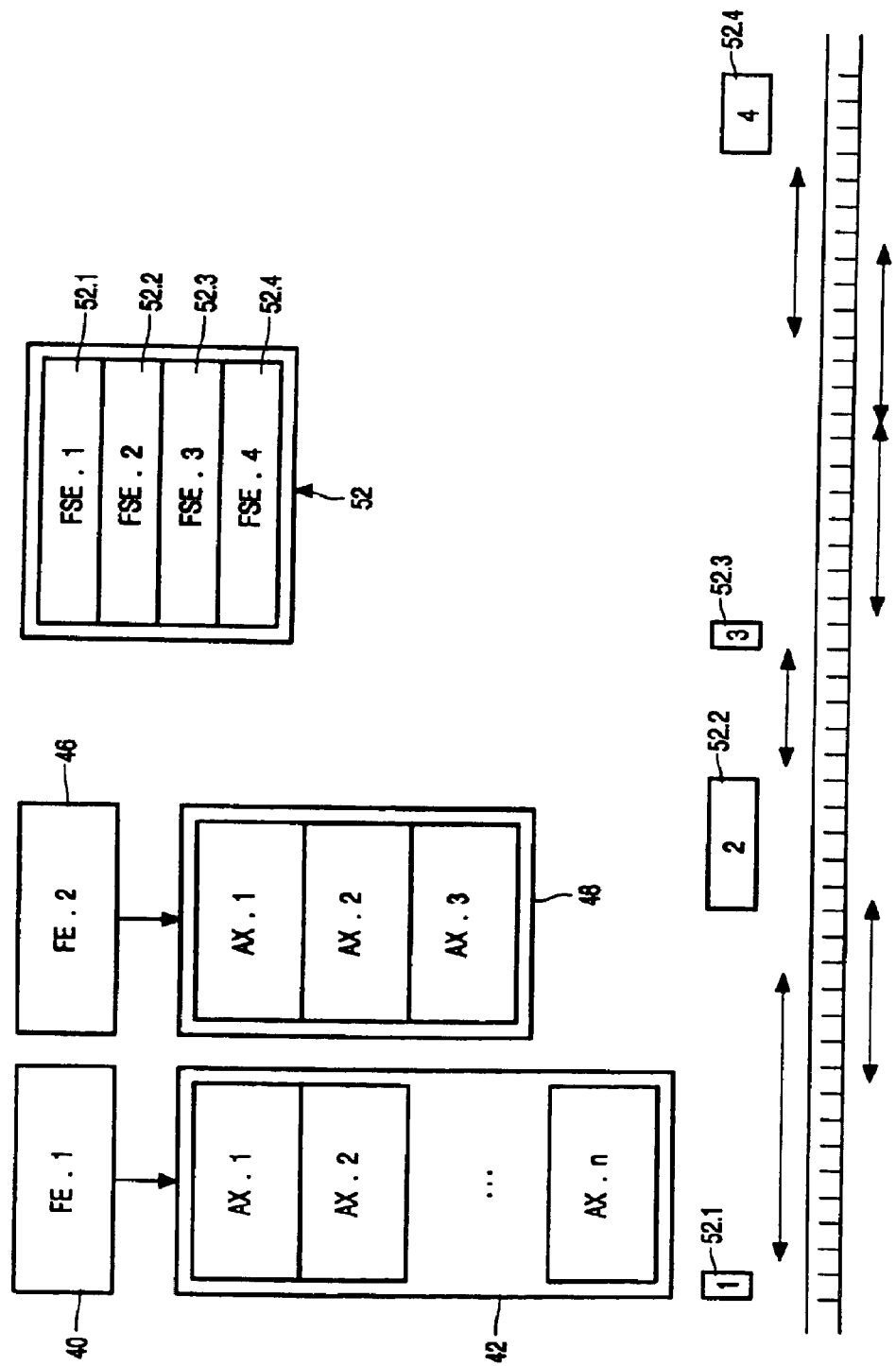
FIG. 5 represents a free-space table derived from the allocated space table of FIG. 4.

An extension to the above-described facilitation for free-space reclamation is shown in FIG. 5 where, in addition to (or in place of the table of allocation space data, a free-space table 52 is provided in the second area. Rather than comprehensively detailing file use of segments and parts of segments, the free-space table is derived from the allocation space data and lists, suitably as start and end points and in sequential physical order, those portions FSE 52.1–52.4 of the first area that are unused or, through a subsequent editing of stored material, those portions containing data unreferenced by any allocation extent which data is therefore (notionally) free for overwriting subject to any constraints on keeping data available for the creation of further files. With both an allocation space table and a free-space table stored, the allocation space table may be written sequentially on the fly, as in FIG. 4, as the respective allocation extents are created, with the updating of the disc/storage media free-space list 52 (which may be a more lengthy process) being reserved to a housekeeping procedure for handling in "idle" moments for the writing system processor and/or at the conclusion of the edit creation.

In terms of industrial application of the foregoing storage mechanism, a particular application is in disc-based video recorders where the amount of video material to be stored is relatively large: even compressed video material takes up a lot of storage space (of the order of 4 Mb for 3 seconds of video) and capacity on disc-based storage media— particularly optical discs—is limited. Such a disc-based video recorder preferably supports some level of user-operated editing capability, where the editing application supported utilises parts of already-recorded video material. By sharing data between two recordings, a saving in disc capacity is achieved and, in circumstances such as multiple edits of a movie being provided on a single disc, the overall usage may be little more than that for a single edit of the movie. If recordings are, or consist of, data files, then sharing parts of a file in the underlying file system provides an efficient solution for sharing data between recordings.

From reading the present disclosure, other variations will be apparent to persons skilled in the art. Such variations may involve other features which are already known in the methods and apparatuses for data management and storage and component parts thereof and which may be used instead of or in addition to features already described herein, and the scope of the present invention is to be determined by the claims appended hereto.

We claim:

1. A storage device comprising:
    a first area subdivided into segments for the recording of sequential data, portions of which when read in a predetermined sequence comprise a data file;
    a second area containing a list of allocation extents, each of which identifies the start and end of a contiguous portion of the first area, and a pointer file containing a list of pointers to respective entries in the list of allocation extents; and
    wherein the device carries at least two files defined in respective pointer files having a portion of a segment less than an entire segment that is common to the two files, with each of the at least two files having a respective allocation extent for that segment and each allocation extent indicating the start and end points within the portion of the segment used in that respective file.

2. A storage device of claim 1, wherein said second area further comprises an allocation space table containing an entry allocation extent, the table providing a record of all single or multiple users of the first area segments.

3. A storage device of claim 2, wherein said second area further contains a free-space table the contents of which arm derived from the contents of the allocation space table and identify all segments or parts of segments that are available for writing.

4. A storage device of claim 1, wherein each allocation extent identifies a start point in terms of a number of bytes to be ignored from the start of a segment.

5. A storage device of claim 1, wherein each allocation extent identifies an end point in terms of a number of bytes to be ignored at the end of a segment.

6. A storage device of claim 1, wherein the storage device is an optical disc and the data written to segments of the first area comprises digitized data that is audio data, video data or a combination thereof; wherein the pointer files comprising respective playlists for all or selected parts of data written.

7. A storage device of claim 1, wherein all segments of the first area are of a common size.

8. A storage device of claim 1, wherein the storage device is an optical disc and the first and second areas comprise respective trucks or contiguous groupings of plural tracks.

9. A method for formatting memory space in a storage medium to be subsequently accessed by a data reading apparatus, comprising the steps of:
  partitioning a first area of the memory space into a plurality of segments for the recording of sequential data, portions of which read in sequence comprise a data file;
  generating and writing to a second area of the memory space a list of allocation extents, each of which identifies the start and end of each said contiguous part of the first area;
  wherein the storage medium contains at least two files having a portion of a segment less than a full segment in common, wherein a respective pointer file is generated and written for of the two files and a respective allocation extent is generated for each use of the segment, the respective allocation extents including an indication of the physical locations of the start and end points within the portion of the segment that is common to the at least two files.

10. A method of claim 9, further comprising the step of generating and writing to the second are an allocation table, the allocation table containing a record of single or multiple uses of all first area segments.

11. A method of claim 10, further comprising the step of generating and writing to the second area a free-space table the contents of which are derived from the allocation space table and identify all segments or parts of segments that are available for writing.

12. A method of claim 11, wherein the step of generating and writing the list of allocation extents includes, for each allocation extent, identifying each start point as a selected number of bytes to be ignored by said data reading apparatus at the start of the respective segment.

13. A method of claim 11, wherein the step of generating and writing the set of allocation extents includes, for each allocation extent, identifying each end point as a selected number of bytes to be ignored by said data reading apparatus at the end of the respective segment.

14. A data processing apparatus operable to manipulate data on a storage medium comprising:
  a data processor coupled with storage medium read/write means, the data processor configured to receive and access said storage medium, the storage medium having:
  a first area subdivided into segments for the recording of sequential data, portions of which when read in a predetermined sequence comprise a data file;
  a second area containing a list of allocation extents, each of which identifies the start and end of a contiguous portion of the first area and a pointer file containing a list of pointers to respective entries in the list of allocation extents; and
  wherein the device carries at least two files defined in respective pointer files and a portion of a segment less than a full segment is common to the two files, with each file having a respective allocation extent for that segment and each allocation extent indicating the start and end points within the segment for that part of the segment; and
  the data processor adapted to receive data identifying those segments or parts of segments comprising a file, the processor generating and storing a pointer together with a list of allocation extents for the segment data, the allocation extents including an indication of physical locations of start and end points for each segment used in the file.

15. A apparatus of claim 14, wherein the data processor is configured to partition the memory space of the storage medium into said first and second areas and to further partition said first area into segments.

16. A apparatus of claim 14, wherein the data processor is further configured to periodically update, or to generate and periodically update, and allocation space table in said second area which table contains an entry for each allocation extent and provides a record of single or multiple file uses of all first area segments.

17. A apparatus of claim 16, wherein the data processor is further configured to periodically update, or to generate and periodically update, a free-space table in said second area, the contents of the free space table derived by the data processor from the contents of the allocation space table and provide a record for those first area segments or parts of data segments that are available for writing.

18. A apparatus of claim 14, wherein the storage means is a writable optical disc and the read/write means is configured accordingly, the data written to the segments in the first area includes digitized audio and/or video data and combinations thereof, and wherein the pointer files are playlists.

19. A storage device of claim 1;
  wherein said second area further comprises an allocation space table containing an entry for each allocation extent, the table providing a record of all single or multiple user of segments;
  wherein said second area further contains a free-space table the contents of which are derived from the contents of the allocation space table and identifies all segments or parts of segments;
  wherein said allocation extent identifies a start point in terms of a number of bytes to be ignored from the start of a segment;
  wherein each allocation extent identifies an end point in terms of a number of bytes to be ignored at the end of a segment;
  wherein the storage device is an optical disc and the data files written to data segments of the first area comprises digitized data selected from the group consisting of audio data, video data and combinations thereof;

wherein the pointer files comprising respective playlists for all or selected parts of the data files;

wherein all segments of the first area are of a common size; and wherein the first and second areas comprise respective tracks or contiguous groupings of plural tracks.

20. A method of claim 9, further comprising the steps of:

generating and writing to the second area an allocation table, the allocation table containing a record of single or multiple uses of all segments;

generating and writing to the second area a free-space table the contents of which are derived from the allocation space table and identify all segments or parts of segments available for writing to;

wherein the step of generating and writing the list of allocation extents includes, for each allocation extent, identifying each start point as a selected number of bytes to be ignored by said data reading apparatus at the start of the respective segment; and wherein the step of generating and writing the list of allocation extents includes, for each allocation extent, identifying each end point as a selected number of bytes to be ignored by said data reading apparatus at the end of the respective segment.

21. A apparatus of claim 14:

wherein the data processor is configured to partition the memory space of the storage medium into said first and second areas and to further partition said first area into said plurality of segments;

wherein the data processor is further configured to periodically update, or to generate and periodically update, an allocation space table in said second area which table contains an entry for each allocation extent and provides a record of single or multiple file uses of all segments;

wherein the data processor is further configured to periodically update, or to generate and periodically update, a free-space table in said second area, the contents of the free space table derived by the data processor from the contents of the allocation space table and containing a record of segments or parts available for writing to; and wherein the storage means is a writable optical disc and the data written to the segments includes data selected from the group of digitized audio data, digitized video data or combinations thereof, and wherein the pointer files are playlists.

22. A storage device of claim 1, wherein the portion of the segment is less than a single data segment.

23. A storage device of claim 1, wherein the portion of the segment comprises a part of a first data segment and a part of a second data segment.

24. A method of claim 9, wherein the part of one segment consists of less than a single data segment.

25. A method of claim 9, wherein the part of one segment comprises a portion of a first data segment and a portion of a second data segment.

26. A data processing apparatus of claim 14, wherein the part of one segment consists of less than a single data segment.

27. A data processing apparatus of claim 14, wherein the part of one segment comprises a portion of a first data segment and a portion of a second data segment.

* * * * *